United States Patent [19]

Fisher et al.

[11] Patent Number: 6,049,547

[45] Date of Patent: Apr. 11, 2000

[54] LOOKAHEAD INTERFLOW OF TRAFFIC AMONG A PLURALITY OF SERVING SITES OF ONE CUSTOMER

[75] Inventors: Thomas S. Fisher, Westminster; Andrew Derek Flockhart, Thornton; Sujeanne Foster, Louisville; Raechel Greschler, Lafayette, all of Colo.; Eugene P. Mathews, Barrington, Ill.; Robert Daniel Nalbone, Thornton, Colo.

[73] Assignee: Lucent Technologies Inc., Murray Hill, N.J.

[21] Appl. No.: 08/856,716

[22] Filed: May 15, 1997

[51] Int. Cl.[7] ....................................................... H04Q 3/64
[52] U.S. Cl. .......................... 370/412; 370/415; 379/266
[58] Field of Search ..................................... 370/412, 413, 370/415, 416, 419, 420, 428, 429, 400, 418, 414, 417; 379/112, 223, 113, 266, 92.03, 92.04

[56] References Cited

U.S. PATENT DOCUMENTS

| | | | |
|---|---|---|---|
| 4,400,587 | 8/1983 | Taylor et al. | 379/113 |
| 4,510,351 | 4/1985 | Costello et al. | 379/112 |
| 4,620,066 | 10/1986 | Bushnell et al. | 379/113 |
| 5,384,841 | 1/1995 | Adams et al. | 379/266 |
| 5,524,147 | 6/1996 | Bean | 379/265 |
| 5,528,678 | 6/1996 | Kaplan | 379/112 |
| 5,530,744 | 6/1996 | Charalambous et al. | 379/112 |
| 5,684,872 | 11/1997 | Flockhart et al. | 379/113 |
| 5,754,639 | 5/1998 | Flockhart et al. | 379/113 |

Primary Examiner—Dang Ton
Assistant Examiner—Tuan Q Ho
Attorney, Agent, or Firm—Werner Ulrich

[57] ABSTRACT

An arrangement for lookahead interflowing traffic among a plurality of serving sites of one customer. Incoming calls received at a site are queued if they cannot be served immediately. Queued calls are then examined periodically and if the call has not yet been served by a local agent and if the call is one of the oldest call in the queue, then the call is a candidate for lookahead interflow. A candidate for lookahead interflow causes a message to be sent to another switch requesting that the call be interflowed. If the other switch accepts the call, the call is routed to that other switch; if the other switch does not accept the interflowed call then the call remains in the queue of the requesting switch and is reexamined at the next period. All calls in the queue are completed to a local agent if a local agent is available.

8 Claims, 4 Drawing Sheets

6,049,547

LOOKAHEAD INTERFLOW OF TRAFFIC AMONG A PLURALITY OF SERVING SITES OF ONE CUSTOMER

TECHNICAL FIELD

This invention relates to the sharing of telecommunication traffic among a plurality of serving sites.

PROBLEM

Many large customers having automatic call distribution systems service incoming traffic from a plurality of sites. These large customers, in order to minimize call answer delay and maximize utilization of the agents at the multiple sites, have arrangements to route traffic that has come into one site to another site for service. This operation is called interflow.

One such operation is called Look Ahead Interflow. With Look Ahead Interflow, the receiving switch has the option to accept or reject the lookahead interflow attempt depending on the status of the receiving switch at the time that the call arrives. The caller maintains his/her position in queue at the sending switch while the lookahead interflow attempt is made. If the attempt is rejected, vector processing continues at the sending switch.

In order to provide a maximum of flexibility to handle the local situations of individual customers, these customers are normally allowed to program the algorithm for lookahead interflow to meet their own needs. However, such programs are limited by the type of lookahead interflow operations that are allowed and implemented in the basic programs that control the automatic call distributors. In prior art systems using lookahead interflow, each call that is queued is periodically examined in order to determine whether it can be served from another site. The result of this arrangement is that many calls may be served out of turn because a call in the middle of the queue may be examined just as agents are becoming available in other sites leaving calls nearer the top of the queue to be served later. Another disadvantage of this arrangement is that a substantial amount of time is required for processing each queued entry whenever an interflow attempt is made so that the rate of examination of the entries in the queue is necessarily slowed down. Since the rate of examination of the queue is generally fixed for any one location, the delay until a call is served from an available agent in another location can be substantial. A problem of the prior art therefore is that arrangements for serving heavy traffic in a multi-location site in the proper order and serving of such traffic with maximum efficiency are inadequate.

SOLUTION

The above problem is alleviated and an advance is made over the prior art in accordance with this invention wherein a queued call is not a candidate for lookahead interflow treatment until it becomes one of the oldest entries in the queue. Advantageously, this allows the oldest entry or entries in the queue to be examined frequently as a candidate for lookahead interflow and it provides these calls with priority over other calls more recently entered in the queue. This type of arrangement is especially useful if one or more of the sites have only a very small number of agents; such sites may not normally directly receive incoming traffic and rely for their traffic on interflow traffic. This arrangement allows calls which have been in queues for the longest time to be routed to available agents at such sites in a very short time because these calls are frequently examined as potential candidates for lookahead interflow.

In accordance with another feature of the invention, calls, whose expected waiting time in the queue is less than a predefined threshold, are not candidates for interflow. This is done so that the system does not attempt to interflow a call that will be serviced locally before an acceptance or rejection message can be received from the alternate switch.

DETAILED DESCRIPTION

Figure 1:
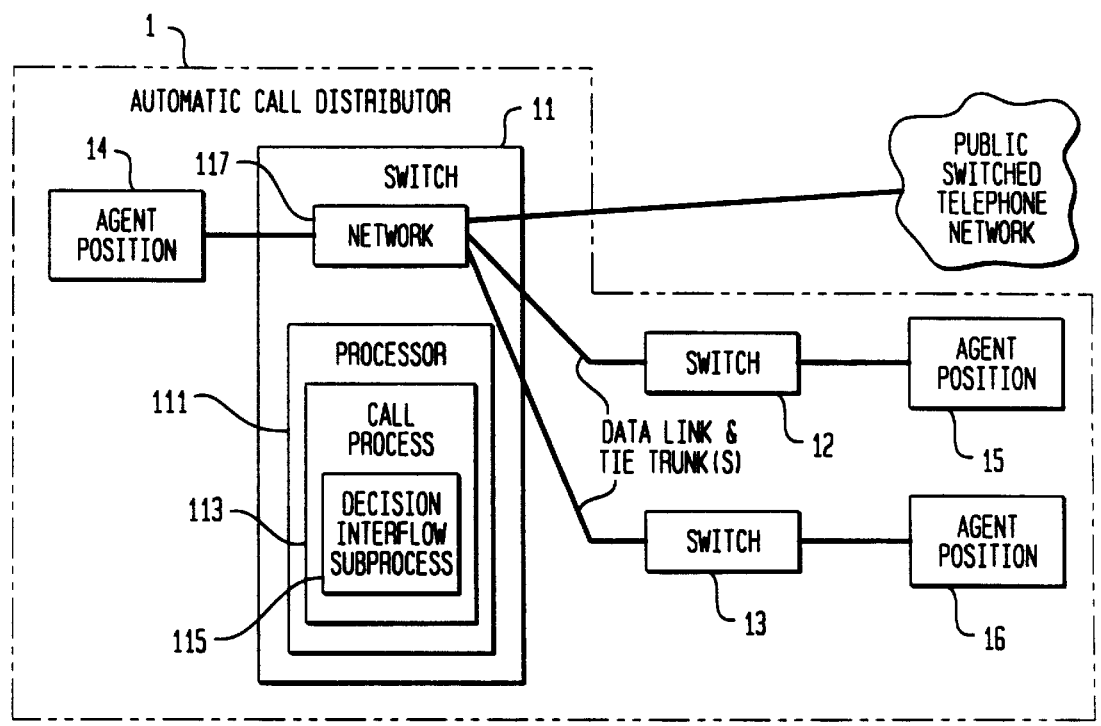
FIG. 1 is a block diagram of a customer network comprising three PBX switches.

FIG. 1 is an overall block diagram of a multi-location automatic call distributor 1. An incoming call is received at the original receiving location 11 which generally has at least one active agent position 14 connected for handling the incoming call. If an original decision is made that the call should be interflowed to a new receiving location 12 or 13 over a tie trunk, then the call is forwarded to the new receiving location 12 or 13 which also has at least one active agent position 15 or 16. The locations are interconnected by tie trunks and by data links. In the preferred embodiment, the tie trunks and data link are B-channels and D-channels of an Integrated Services Digital Network Primary Rate Interface (ISDN-PRI).

Each of the receiving locations is a Private Branch Exchange (PBX) switch. Each switch, such as switch 11 comprises a switching network 117, possibly connected to the public switched telephone network, for receiving incoming calls, connected to agent positions such as agent 14, and connected to tie trunks to other switches of the multi-location automatic call distributor 1. Connections through the switching network are controlled by a processor 111 which includes call establishment and lookahead interflow decision process 113 stored in memory of the processor. This process includes a lookahead interflow decision subprocess 115 which is the subject of applicant's invention.

Figure 2:
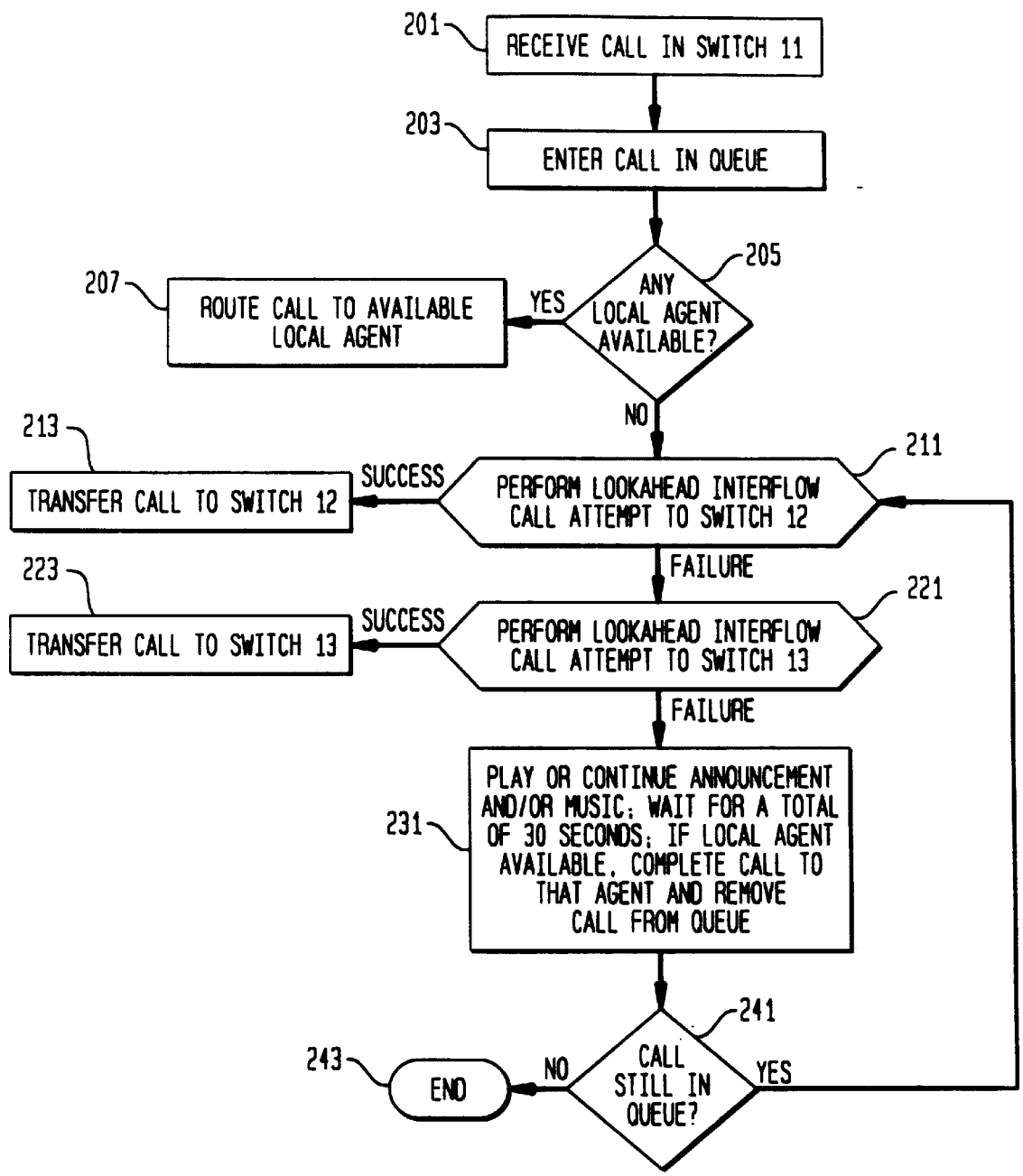
FIG. 2 is a flow chart of prior art lookahead interflow arrangements.

FIG. 2 illustrates the actions performed in switch 11 in the prior art. Variations of the details of the typical program illustrated in FIG. 2 are programmable by a customer to satisfy specific local needs. The programming arrangement is one such as the call vector arrangement available in the Definity® PBX. Switch 11 receives a call (action block 201) and enters the call in its queue for its own local agent positions and their associated agents (action block 203). Test 205 is used to determine if the queue is empty and any local agent is available. If so, then the call is routed to an available local agent (action block 207). If the queue is not empty or no local agent is available, the call is queued. Action block 211 represents a lookahead call attempt to switch 12. (In variations of the program of FIG. 2, such a lookahead call attempt would be made only if the expected wait time exceeds a threshold, such as 15 seconds.) A lookahead call attempt is made by sending a message to switch 12. If switch 12 accepts the call, it will send an accept message and the call is routed to switch 12 (action block 213). If switch 12 rejects the call then a lookahead call attempt is performed to switch 13 (action 221). If switch 13 accepts the lookahead call attempt, then the call is transferred to switch 13 (action block 223). If switch 13 rejects the lookahead call attempt, the call remains in the queue and an announcement and/or music is played for the customer (action block 231). A waiting time of, typically 30 seconds is then incurred. If during these 30 seconds, a local agent becomes available, then the call is transferred to that local agent as in action block 207, and the call is removed from the queue. At the end of the 30 second interval, test 241 determines whether the call is still in the queue. If the call is still in the queue, then action block 211 is entered in order to try another lookahead attempt to switch 12 and switch 13, and to continue the announcement and/or music being played to the customer. If the call is no longer in the queue this is the end of the operation (action 243). Note that test 241 is a symbolic rather than a real test in the sense that if the call is still in the queue the "yes" leg of action 241 is automatically executed at the end of the 30 seconds, whereas if the call is no longer in the queue, there is no need to make such a test. The 30 second interval is typical in present PBX, because the resource utilization required to perform a lookahead call attempt is substantial, so that a number significantly lower than 30 seconds would cause excessive load to be placed on the controlled processor of switches 11, 12, and 13.

The disadvantage of this prior art arrangement is that while queue still controls which call can be routed first to a local agent, the routing of calls to an agent at one of the other switches is almost random and independent of the time at which the call arrived at switch 11. Further, during a period when switch 11 has a relatively small number of local agents and has a relatively smaller number of calls arriving, such calls may encounter unnecessarily high delays before they can be interflowed to available agents in switch 12 or switch 13.

Figure 3:
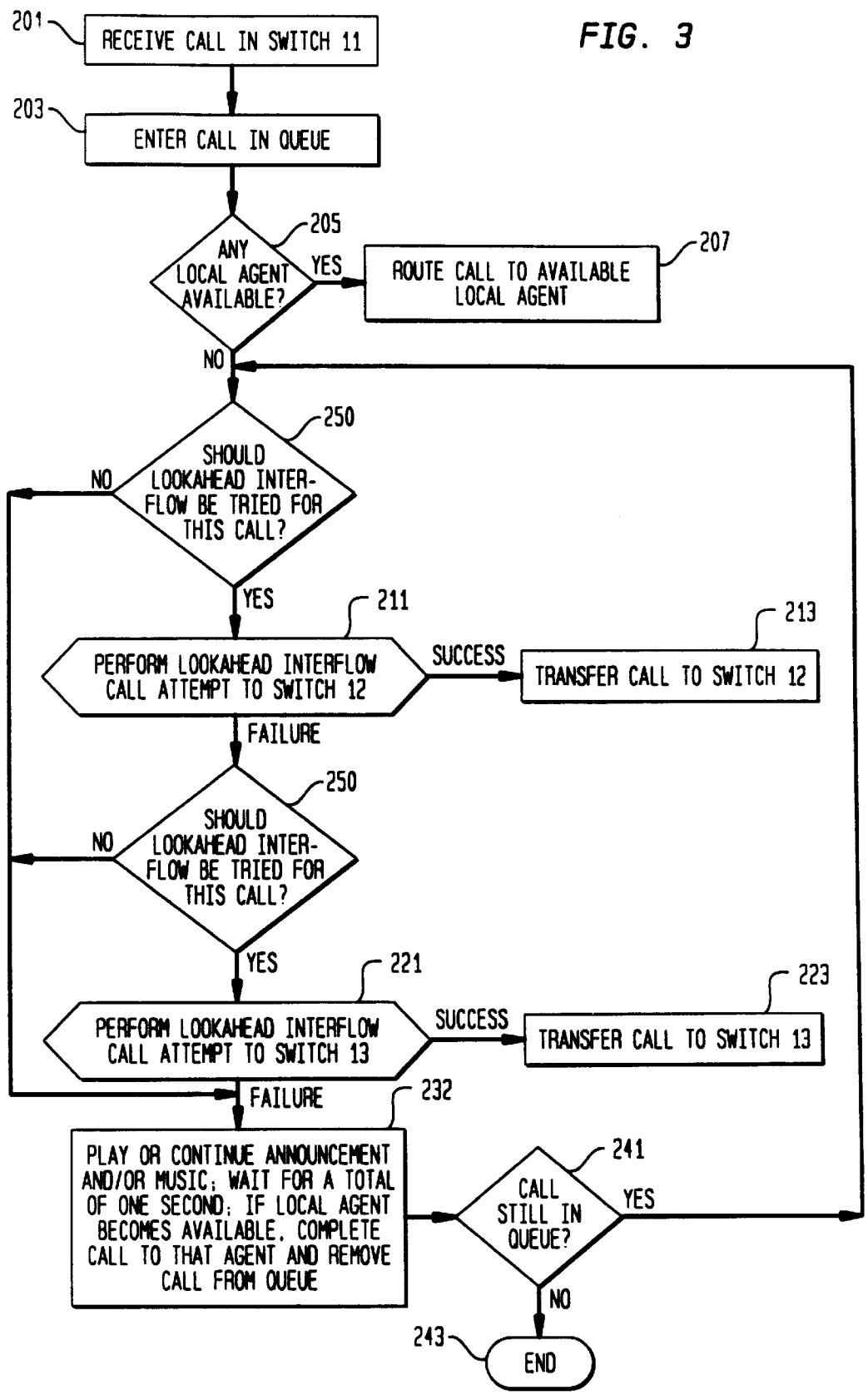
FIG. 3 and 4 are flow charts of lookahead interflow arrangements in accordance with applicant's invention.

These disadvantages are overcome by applicant's invention, in accordance with the changes made from FIG. 2 to FIG. 3. These figures are identical except that action block 232 has replaced action block 231 and test 250 has been inserted in a number of places. Test 250 is used to determine whether lookahead interflow should be tried for this call before each lookahead attempt at blocks 211 and 221. If so, then action block 211 or action block 221 is entered and if not, action 232 is directly entered. Following a positive result of test 250, i.e., lookahead interflow should be tried, action block 211 is entered for the first case, while action block 221 is entered for the second case. If the result of test 250 is negative (i.e., lookahead interflow should not be tried at this time), action block 232 is entered for both cases. Action block 232 of FIG. 3 differs from action block 231 of FIG. 2 only in that the 30 second interval, a typical interval for use with the prior art, has been reduced to one second, a typical interval in accordance with the teachings of applicant's invention. Because the lookahead interflow attempt is made in general only for the older calls in the queue, the resource utilization for interflow attempts is sharply reduced on an average call and therefore can be sharply increased for the older calls in the queue.

Under normal circumstances, only the call at the head of the queue will be allowed to interflow. In this case, calls will be serviced from queue in strict FIFO order, subject to the restriction of test 252 (FIG. 4).

Figure 4:
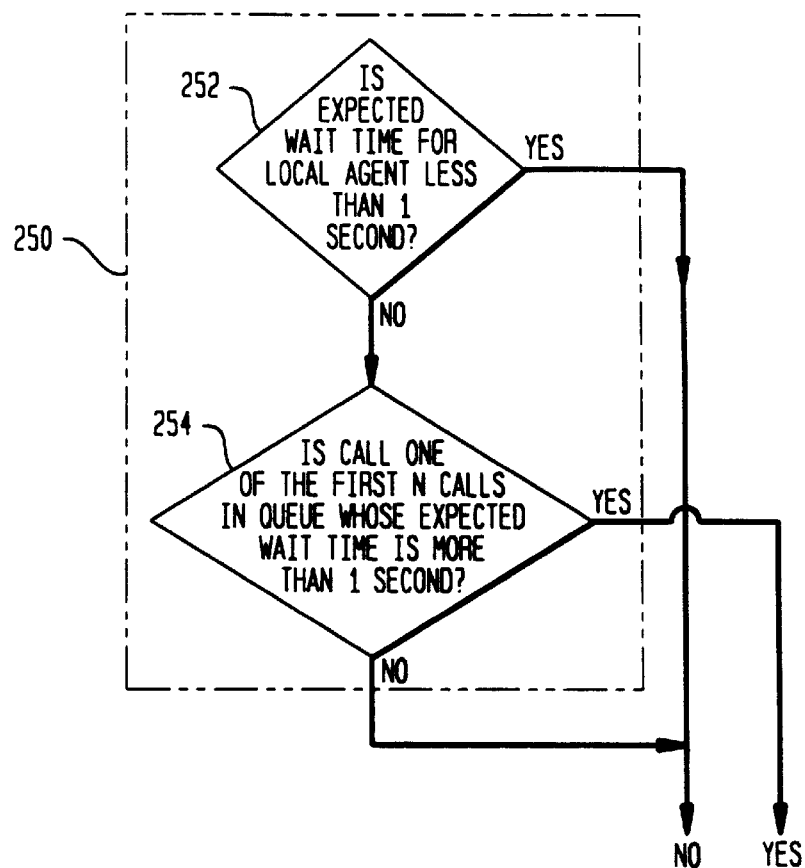

FIG. 4 is an expansion of test 250. Test 252 determines whether the expected wait time for the call is less than the expected wait time it takes to successfully complete a lookahead interflow call attempt. In this example, this time has been set to 1 second. If so, then no lookahead interflow attempt is made for that call at that time. If the result of test 252 is negative, then test 254 determines whether this call is one of the "N" oldest calls in the queue whose expected wait time is more than the expected wait time for a successful lookahead interflow call attempt.

For a simple case, test 252 is bypassed and test 254 checks only if this is the first call in the queue. (Effectively, the one second interval is treated as zero and N is treated as one.) However, for especially large groups of agents, it is desirable that an interflow attempt be made for any of the first several, i.e., perhaps the first three, calls in the queue. Since with large groups of agents, successive calls in the queue are served with a very short wait time between these calls, in general, N would be one for small and medium size of groups of agents but can be higher for very large groups of agents.

Alternatively, test 250 can limit lookahead interflow attempts to those cases where the expected wait time has met the minimum criterion discussion above (test 252), and is further limited to calls having an expected wait time below some upper threshold such as 10 seconds. The advantage of this technique is that it is dynamic in the number of calls which are permitted to interflow at any given moment in time. At periods of low call volume, only one call at any given moment in time would meet this criteria. On the other hand, when there are a large number of agents staffed and call volumes are very high, multiple calls would pass this test and a higher volume of calls would be interflowed. This limit is substituted for test 254.

Figure 5:
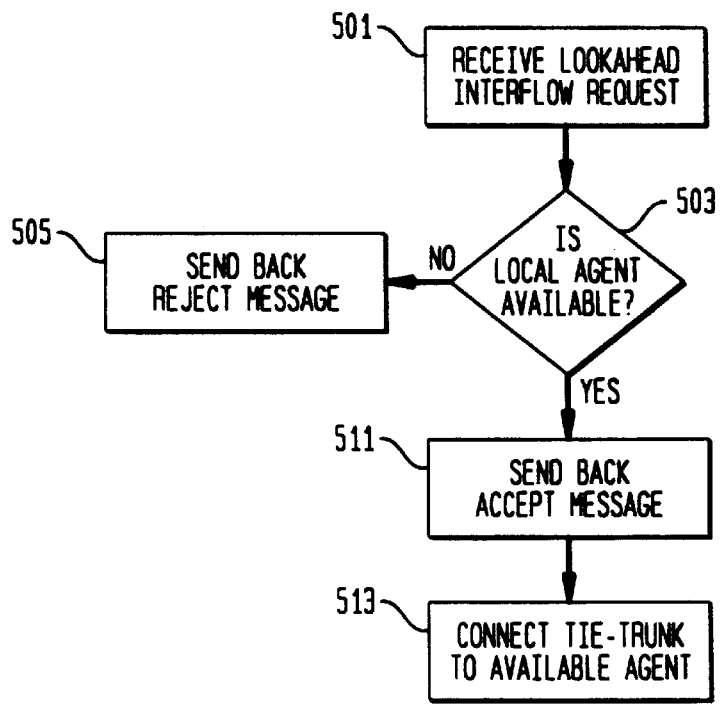
FIG. 5 is a flow chart of prior art lookahead interflow treatment at the target switch, which is also used in applicant's embodiment.

FIG. 5 illustrates actions performed in switch 12 or switch 13 in responsive to a lookahead interflow request from switch 11. These actions are essentially the same as in the prior art. The lookahead interflow request message is received (action block 501). The receiving switch makes the determination of whether the interflow request is to be accepted or rejected. In one simple arrangement, the receiving switch accepts interflowed calls only if a local agent is available. Therefore test 503 determines whether a local agent is available. If not, then a reject message is sent back to the requesting switch. If an agent is available, then an accept message is sent back (action block 511) and an available local agent is connected to a tie trunk connected to the requesting switch. With the DEFINITY operation, the lookahead request message and the call setup message are actually one and the same thing. When a lookahead request is sent, a tie-trunk is seized and a voice path between the switches is created. However, the caller is only cut through if and when an accept message is received. If the attempt is denied, the tie trunk is simply dropped. Clearly the decision concerning acceptances can be more complex; for example, a decision can be made to accept interflow calls if the expected wait time in the target switch would not exceed more than a given limit. In that case, calls that are interflowed might be queued, instead of being directly connected to an agent. However, the calls would be switched to the receiving switch, and would receive appropriate announcement treatment (to avoid confusing the caller) from that switch.

We claim:

1. Apparatus for serving incoming telecommunications traffic at a plurality of serving sites comprising:

means for receiving traffic at one of said serving sites;

means for interflowing traffic received at said one serving site to another serving site; and means for deciding for which queued calls a look ahead interflow attempt to another serving site should be tried;

wherein said means for deciding for which queued call a look ahead interflow attempt will be tried will only consider attempting to overflow older queued calls in the queue of the interflowing service site;

wherein a look ahead interflow attempt comprises sending a query to a receiving site, receiving a response from the receiving site, and interflowing a call only if said response is an accept response.

2. The apparatus of claim 1, further characterized in that said means for deciding will only consider attempting interflow for the oldest queued call in the queue of the interflow service site.

3. The apparatus of claim 1, further characterized in that said means for deciding will refrain from considering attempting interflow for a queued call for which the expected wait time is less than a pre-determined threshold.

4. The apparatus of claim 1, wherein a call for which a look ahead interflow attempt is attempted can be rejected by the target switch.

5. The apparatus of claim 1, wherein said means for deciding, comprises means for periodically examining each queued call, but attempting an interflow only if the queued called being examined is an older queued call.

6. The apparatus of claim 1, wherein said older queued calls comprise the oldest N queued calls wherein N is a predetermined parameter stored in the interflowing system.

7. The apparatus of claim 1, wherein said older queued calls are limited to calls whose expected wait time is less than a predetermined parameter stored in the interflowing system.

8. A method of serving incoming telecommunication traffic from a plurality of serving sites comprising:

receiving traffic at one of said serving sites;

if said call cannot be immediately served by a local agent, queuing said call;

periodically examining each queued call as a candidate for a look ahead interflow attempt;

wherein said examining step comprises the step of attempting to interflow said call to another serving site only if said queued call is one of the older queued calls in the queue;

wherein a look ahead interflow attempt comprises sending a query to a receiving site, receiving a response from the receiving site, and interflowing a call only if said response is an accept response.

* * * * *